# United States Patent [19]
Yamamoto et al.

[11] 3,821,126
[45] June 28, 1974

[54] PROCESS FOR PRODUCING AMPHOTERIC RESIN

[75] Inventors: Atsushi Yamamoto; Shigenori Ohta, both of Tokyo, Japan

[73] Assignee: Kyowa Hakko Kagyo Co., Ltd., Tokyo, Japan

[22] Filed: June 21, 1972

[21] Appl. No.: 264,793

[30] Foreign Application Priority Data
June 26, 1971 Japan.............................. 46-46042

[52] U.S. Cl. .......................... 260/2.1 R, 260/2.2 R
[51] Int. Cl. ............................................ C08f 27/08
[58] Field of Search ...................... 260/2.2 R, 2.1 R Primary Examiner—Melvin Goldstein
Attorney, Agent, or Firm—Craig and Antonelli

[57] ABSTRACT

A process for producing an amphoteric resin which comprises reacting an esterified carboxylic acid type ion exchange resin with a basic amino acid.

11 Claims, No Drawings

PROCESS FOR PRODUCING AMPHOTERIC RESIN

This invention relates to a process for producing an amphoteric resin having an optical resolution activity upon racemates and a chelating activity upon metallic ions.

Now, a number of medicaments, food additives and other chemicals are synthesized chemically, and most of those compounds have optical activities. For example, with respect to sodium glutamate commonly used as a seasoning, only the L-isomer is effective. Further, as to lysine which is important as an essential amino acid, only L-isomer is effective. In the chemical synthesis of those substances, L-isomer and D-isomer are synthesized in equal amounts to form a racemate, different from that produced by the reaction in the living bodies. Resolution of the racemates is one of the important steps in the production of the effective compounds.

The optical resolution of racemates may be carried out according to a fractional crystallization method, a method based on the utilization of physico-chemical properties of diastereoisomer, or a method based on the utilization of an enzyme such as acylase. Also, the resolution with an optically active resin has been recently noted with interest because the operation including continuous operation, etc. can be carried out readily [Ind. Eng. Chem. Vol. 60, Aug. p. 12 (1968)]. Natural L-isomer of an amino acid is used as a raw material for an optically active resin. However, its stereospecific adsorption action is limited, because it is bonded to the resin matrix through the $\alpha$-positioned carboxyl group or $\alpha$-positioned amino group. Therefore, its optical resolution ability is low, and an optically active resin having an $\alpha$-positioned amino group and an $\alpha$-positioned carboxyl group as the same time is required.

Further, in many chemical industries metallic ions are used as catalysts, and in the food industry it is necessary to remove heavy metal ions of toxic materials. To recover or remove these metallic ions, a resin having a chelating activity is required. It has been known for a long time that an amino acid forms a stable chelate compound with a metallic ion. It is, in general, understood that there are necessarily $\alpha$-positioned carboxyl and amino groups at the same time when an amino acid forms a stable chelate compound with a metallic ion.

As described above, a resin having $\alpha$-positioned amino and carboxyl groups at the same time has the optical resolution activity and the chelating activity, and is useful for optical resolution of racemates or recovery and removal of metallic ions.

As a process for producing such an amphoteric resin, it is disclosed that the resin can be obtained by copolymerizing, for example, $\omega$-N-methacryloyl lysine or $\omega$-N-methacryloyl ornithine with a cross-linking agent such as divinylbenzene (Japanese Patent No. 453,114). In this method, a side reaction takes place at the copolymerization, and $\alpha$-carboxyl and $\alpha$-amino groups of the amino acid portion undergo reaction. Further, the synthesis of these monomers, derivatives of lysine and ornithine, requires copper chelate compounds of these amino acids as a raw material, and therefore this method has such a disadvantage that it is hardly applicable in an industrial scale.

The present inventors have found a novel and simple process for producing an amphoteric resin having $\alpha$-positioned amino and carboxyl groups at the same time by allowing an ester of carboxylic acid-type, weakly acidic cation exchange resin to react with a basic amino acid having an $\omega$-amino group to combine the amino acid to the resin matrix by the acid-amide bond at the $\omega$-amino group, and have accomplished the present invention.

Usually, in the synthesis of carboxylic acid-type ion exchange resin, an unsaturated fatty acid ester such as methacrylic acid ester or acrylic acid ester, is copolymerized with a cross-linking agent, and then the resultant ester is hydrolyzed, whereby the desired ion exchange resin is obtained. However according to the present invention the desired amphoteric resin can be so advantageously obtained by a simple and single reaction, using as a raw material the ester of the resin as it is before the hydrolysis. The present invention will be explained in detail below:

As a suitable esterified carboxylic acid-type cation exchange resin, a copolymer of methacrylic acid ester or acrylic acid ester and a cross-linking agent capable of undergoing copolymerization therewith such as divinylbenzene, can be used, or a carboxylic acid-type resin can be used after it has been converted to an ester according to a conventional method. As the ester, esters of any of the aliphatic and aromatic alcohols can be used, but aliphatic alcohols having one to four carbon atoms and aromatic alcohols having six to nine carbon atoms are preferably employed. Further, to obtain the amphoteric resin bonded with large amount of amino acids, ethyl ester and para-nitrophenyl ester are particularly desirable. As the amino acid, basic amino acids having an $\omega$-amino group, for example, lysine, ornithine, etc., are used. When the optically active resin is desired, an optically active amino acid, for example, L-isomer of lysine is used. When the chelating resin is desired, a racemate can be, of course, used.

By subjecting these two raw materials to reaction, $\omega$-amino group of the amino acid reacts with the carboxylic acid ester of the resin to form an acid-amide bond, whereby the desired amphoteric resin having $\alpha$-positioned amino and carboxyl groups at the same time can be synthesized.

The reaction is carried out in a solvent. Water and a mixed solvent of water and a water-miscible solvent such as methanol, ethanol, acetone, etc., can be used as reaction medium. The reaction temperature is not critical, but usually below 100°C.

Amino acid may be used either in a free form or in a salt form. When the amino acid is employed in a salt form, for example, lysine hydrochloride is employed, the reaction mixture is preferably adjusted to a neutral to alkaline state with an alkali such as sodium hydroxide or the like.

Usually, it is preferable that the employed amount of the amino acid or its salt is equivalent to or more than that of the carboxylic acid ester of the resin.

The amount of amino acid covalently bonded with the resin is variable depending on the nature of the resin, the species of the ester and the amino acid or salt, the degree of esterification of the carboxyl group, and the reaction conditions.

The larger amount of amino acid the amphoteric resin contains, the higher its activity for optical resolution and chelation is. Therefore, it is apparently desirable that more amount of amino acid is contained in the resin. However, steric restriction results in a certain limited bonding, usually 200 to 500 mg amino acid per gram resin.

Embodiments of the present invention are illustrated in the following examples:

Example 1

100 g of H-form Amberlite IRC-50, a weakly acidic cation exchange resin [trademark (a copolymer resin of methacrylic acid and divinylbenzene produced by Rohm and Haas Co., U.S.A.)], which is dried at 105°C., is suspended in a mixed solution of 500 ml of thionyl chloride and 6 ml of pyridine, and refluxed for 20 hours. After the reaction, the resin is separated by filtration, washed with toluene and dried in vacuum. Then, the chlorinated resin is suspended in a mixed solution of one liter of ethanol and 50 ml of pyridine, refluxed for 20 hours, separated by filtration and washed with ethanol and then water, whereby the esterified resin is obtained. The thus obtained resin is added to one liter of an aqueous solution containing 300 g of L-lysine and heated at 100°C. for 2 hours. Thereafter, the resulting resin product is separated by filtration; washed with water, and with 1 N acetic acid, and then with water again; and dried, whereby the desired resin is obtained. In the resin, lysine is combined in the ratio of 320 mg per 1 g of the raw material resin.

Example 2

An acid chloride of carboxylic acid-type resin obtained from 100 g of Amberlite IRC-50 in the same manner as in Example 1 is added to 700 ml of an acetone solution containing 300 g of para-nitrophenol, refluxed for 24 hours and separated by filtration. The resin product is washed with acetone and then with water, whereby the esterified resin is obtained. The thus obtained esterified resin is suspended in an aqueous solution containing 270 g of L-ornithine and subjected to reaction at 80°C. for 5 hours. Thereafter, the resin is separated by filtration and washed with water, and with 1 N acetic acid, and then with water again, whereby the desired resin is obtained. In the resin, ornithine is combined in the ratio of 410 mg per 1 g of the raw material resin.

Example 3

100 g of a copolymer consisting of 94 percent methacrylic acid ethyl ester and 6 percent divinylbenzene is added to 1.2 liters of an aqueous 50 percent ethanol solution containing 300 g of L-lysine, refluxed for 4 hours, separated by filtration, and washed with water, and with 1 N acetic acid, and then with water again, whereby the desired resin product is obtained. In the resin, lysine is combined in the ratio of 350 mg per 1 g of the raw material resin.

While the novel principles of the invention have been described, it will be understood that various omissions, modifications and changes in these principles may be made by one skilled in the art without departing from the spirit and scope of the invention.

What is claimed is:

1. A process for producing an amphoteric resin having $\alpha$-positioned carboxyl and amino groups which comprises reacting an esterified methacrylic acid-divinyl benzene copolymer with a basic amino acid containing an $\omega$-amino group in a solvent.

2. The process of claim 1, wherein the basic amino acid includes L-lysine and ornithine.

3. The process of claim 1, wherein the esterified methacrylic acid-divinyl benzene copolymer is obtained by esterification of the copolymer by a conventional procedure.

4. The process of claim 1, wherein the solvent is water or an aqueous solution of a water-miscible solvent.

5. The process of claim 4, wherein the water-miscible solvent is one selected from the group consisting of methanol, ethanol and acetone.

6. The process of claim 1, wherein the reaction is carried out at a temperature of about 100° C.

7. The process of claim 6, wherein the temperature is from 80°C. to 100°C.

8. The process of claim 2, wherein the ornithine and lysine are L-isomers.

9. The process of claim 1, wherein the esterified methacrylic acid-divinyl benzene copolymer is prepared by reacting one member selected from ethyl esters and para-nitrophenyl esters of methacrylic acid with divinyl benzene.

10. The process of claim 1, wherein the esterified methacrylic acid-divinyl benzene copolymer is prepared by reacting an ester of methacrylic acid selected from the group consisting of an ester of an aliphatic alcohol having from one to four carbon atoms and an ester of aromatic alcohols having six to nine carbon atoms with divinyl benzene.

11. The process of claim 1, wherein the basic amino acid is in a salt form and the reaction mixture is adjusted to a neutral or alkaline state with an alkali hydroxide.

* * * * *